United States Patent [19]

Malecha

[11] Patent Number: 5,176,232
[45] Date of Patent: Jan. 5, 1993

[54] HIGH-SPEED ROLLER ONE-WAY CLUTCH

[75] Inventor: Gregory J. Malecha, Naperville, Ill.

[73] Assignee: Borg-Warner Automotive Transmission & Engine Components Corporation, Sterling Heights, Mich.

[21] Appl. No.: 819,312

[22] Filed: Jan. 9, 1992

[51] Int. Cl.5 .............................................. F16D 41/00
[52] U.S. Cl. ..................................... 192/45; 192/41 R
[58] Field of Search ............................... 192/45, 41 R

[56] References Cited

U.S. PATENT DOCUMENTS

| 3,187,863 | 6/1965 | Giometti | 192/45 |
|---|---|---|---|
| 3,917,036 | 11/1975 | Johnson et al. | 192/45 |
| 4,054,192 | 10/1977 | Johnson | 192/45 |
| 4,088,211 | 5/1978 | Doller et al. | 192/45 |
| 4,821,856 | 4/1989 | Lederman | 192/45 |
| 4,989,705 | 2/1991 | Kashio et al. | 192/45 |
| 5,042,628 | 8/1991 | Malecha | 192/45 |
| 5,046,229 | 4/1991 | Lederman | 192/45 X |
| 5,062,512 | 11/1991 | Lederman | 192/45 |

Primary Examiner—Leslie A. Braun
Assistant Examiner—Nicholas Whitelaw
Attorney, Agent, or Firm—Brooks & Kushman

[57] ABSTRACT

A roller clutch (20) having a cage (32) having a plurality of barbed posts (40) installed between substantially coaxial clutch races (24,26) for aligning and mounting bearing blocks (42) around the cage (32) for fixed rotational movement and including a contoured pocket (44) on one side for nesting a roller (22) and a spring (48) mounted on the other side that circumferentially urges a roller (22) nested in an adjacent bearing block (42) to permit stable performance under high speed operating conditions.

18 Claims, 3 Drawing Sheets

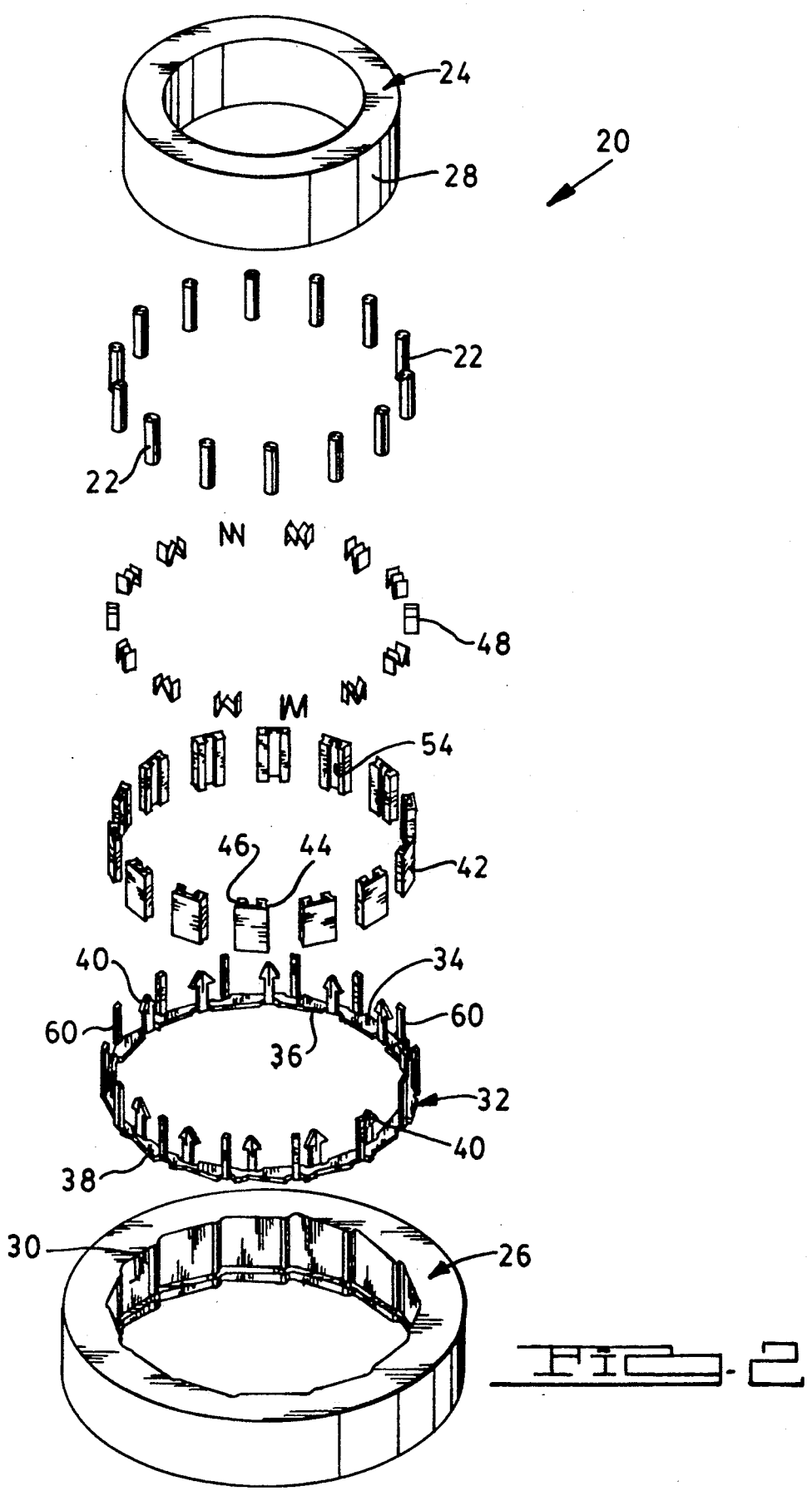

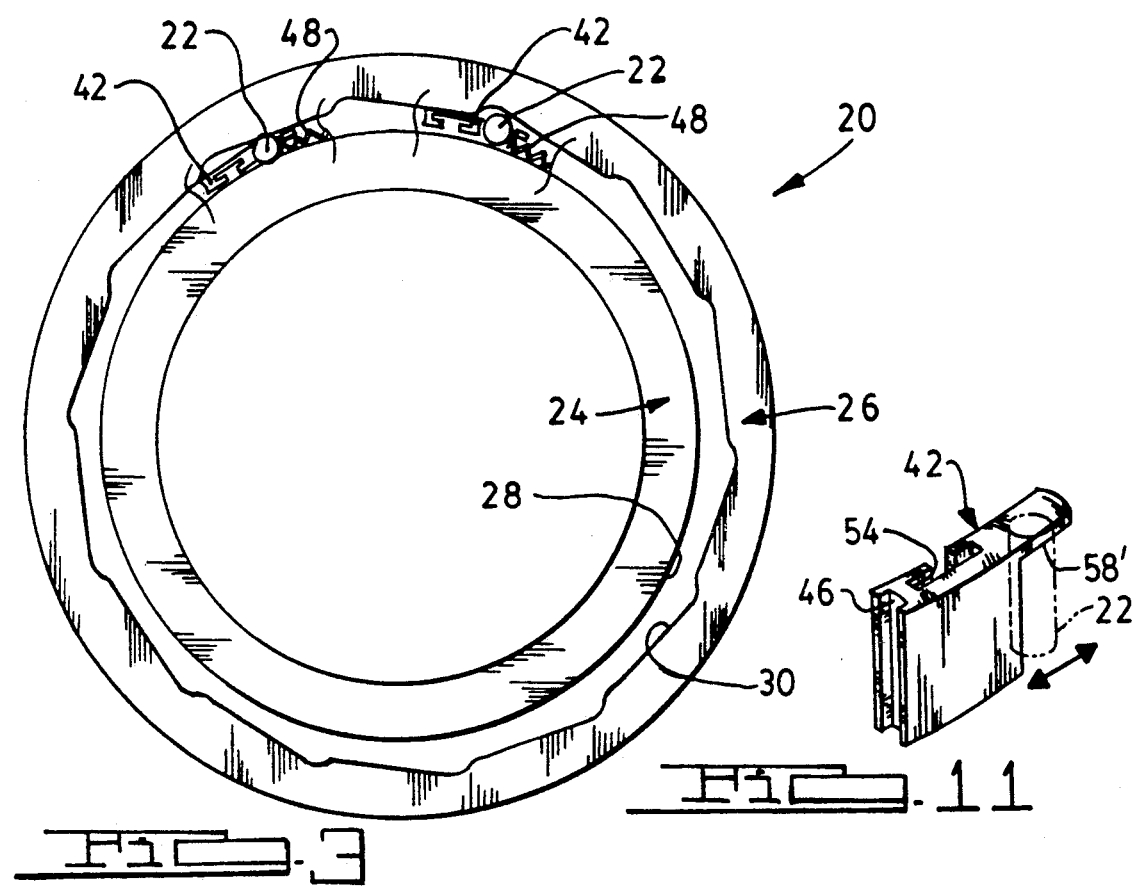
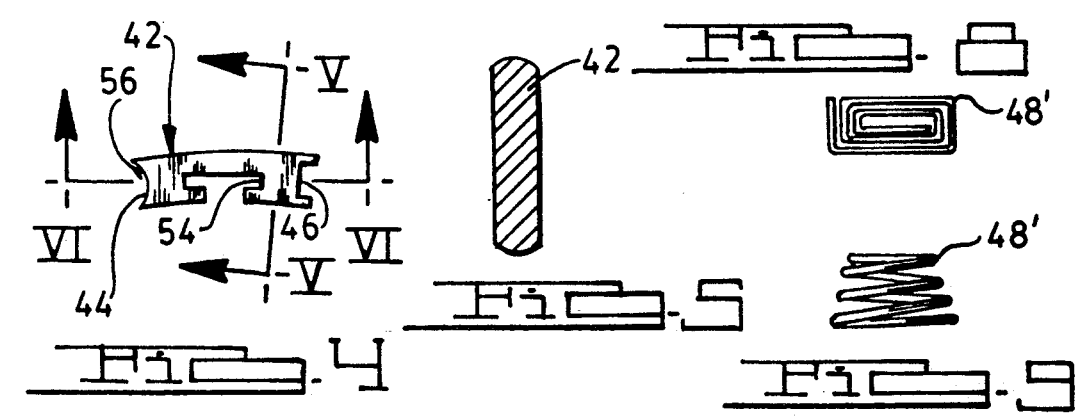
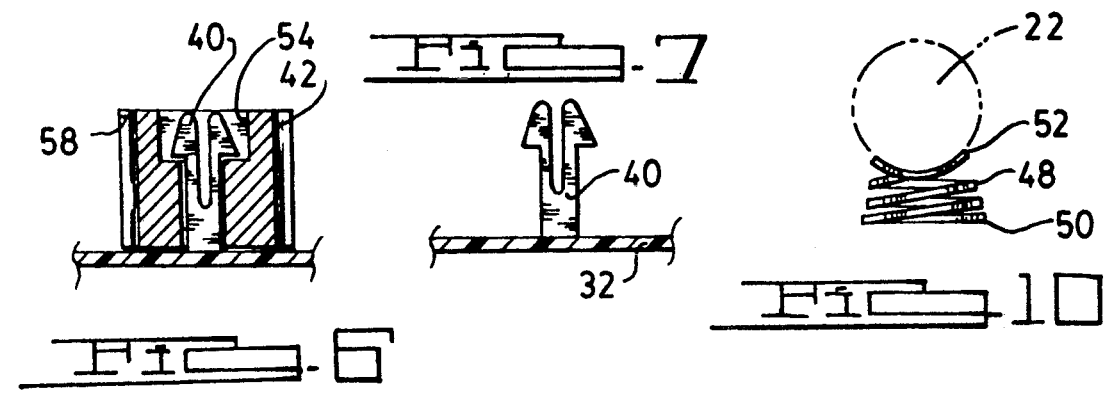

5,176,232

HIGH-SPEED ROLLER ONE-WAY CLUTCH

TECHNICAL FIELD

This invention relates to one-way clutches used in automatic transmissions and more particularly to a clutch having an improved cage, bearing block and spring arrangement for high speed applications.

BACKGROUND ART

Conventional roller clutches have a plurality of cylindrical rollers that are located in wedging pockets formed between a cylindrical pathway of one clutch race and a series of sloped cam ramps on another clutch race. A cage fitted to one race usually has side rails of some type to confine the ends of the rollers and prevent them from moving axially out of the annular spaced between the races. Individual energizing springs continually urge each roller up the cam ramp to a ready position. Because of eccentricities between the races and other factors, the rollers move circumferentially back and forth within the wedging pockets during clutch operation.

Typically, there is no significant limitation on circumferential roller travel by the cage or the springs in a conventional roller clutch, nor is there any particularly effective control of the roller's operation during overrun. The need for free roller travel makes control difficult especially at high speeds.

The ability of prior art roller clutches to accommodate high speeds has been improved by the use of roller control cars which carry the individual rollers and guide the rollers as they are adjusted relative to the inner and outer races during operation. Each roller has an individual control car that completely surrounds the roller closely enough to retain it securely. Patents that consider roller control include U.S. Pat. Nos. 4,821,856; 4,893,702; and 4,993,528.

Such roller car constructions, however, are complicated and add to manufacturing costs.

DISCLOSURE OF INVENTION

An object of the present invention is to provide an improved one-way clutch which permits operation in applications which are above maximum speed limits for typical prior art roller one-way clutches.

Another object of the invention is to provide an improved one-way clutch having improved roller support under high speed operation and under eccentric conditions.

A further object of the present invention is to provide an improved one-way clutch having improved raceway compliance.

Still another object of the present invention is to provide an improved one-way clutch having roller support that prevents axial dislodging of the rollers.

Yet another object of the present invention is to provide a one-way clutch having less spring oscillation.

A further object of the present invention is to provide an improved one-way clutch having reduced roller mass.

In carrying out the above objects and other objects of the present invention, the improved roller clutch is one of the type in which a plurality of cylindrical rollers is located between a pair of substantially coaxial clutch races and in which the upper and lower surfaces of each of the rollers are selectively engageable with the races in a cylindrical pathway on one clutch race and a respective confronting sloped cam ramp formed on the other clutch race. The rollers between the clutch races move in the circumferential direction between the races during clutch operation.

A cage is adapted to be installed between the races so as to maintain a substantially fixed orientation relative to the axis of the races. The cage is defined by a ring having inner and outer peripheral edges. The inner edge is generally circular and the outer edge has a shape generally corresponding to a confronting sloped cam ramp formed on the outer race surface of the outer race. The cage includes a plurality of barbed posts extending from the ring between the races that are generally parallel to the coaxial axes of the races.

A plurality of bearing blocks is mounted over the barbed posts. This mounting permits misalignment and movement of the bearing blocks as required during operation. Each bearing block includes a contoured pocket on one side for nesting a respective roller and an attachment portion on the side opposite the pocket for mounting a spring. Each spring has one end mounted in the attachment portion of the bearing block. Its second end is urged in circumferential engagement with the roller nested in an adjacent bearing block. This arrangement provides stable performance under high speed operating conditions.

Preferably, the bearing block includes a notched channel or slot, extending generally parallel to race axes between the contoured pocket side and attachment portion side for receiving the barbed posts to lock the bearing blocks on the cage between the races. A shipping ledge formed in each bearing block defines a terminus of the contoured pocket side and prevents axial dislodging of the rollers nested in the bearing blocks.

In the preferred embodiment, the attachment portion for mounting the springs of the bearing block is a channel extending in the axial direction along the bearing block. Also, the cage further includes a plurality of formed posts, one for each ring, alternately spaced between the barbed posts, and extending from the ring generally parallel to the coaxial direction to protect the springs from pinching and to provide support to the rollers under high speed and eccentric conditions. Most preferably, these formed posts are shaped to match the roller contour and position. Alternatively, they are angled to match roller contour position.

Preferably, the cage is of a metal or composite material composition having a special coating or impregnation to reduce friction at the roller ends. The preferred springs are of a flat Z spring configuration, although formed wire configuration springs can be utilized.

Low mass components such as hollow rollers enhance speed capability due to reduced mass and enhanced engagement characteristics. The rollers can be made of ceramic material to further reduce mass.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is an assembly view of the roller clutch of FIG. 1;

FIG. 3 is a side elevational view of the roller clutch illustrating its bearing block, roller, and spring arrangement;

FIG. 4 is a detailed view of the bearing block illustrating a contoured pocket on one side and a spring attachment portion on the other side;

FIG. 5 is a sectional view taken along the line 5—5 in FIG. 4 illustrating the arcuate profile of the ends of the bearing block;

FIG. 6 is a detailed view illustrating the mounting of the bearing block on a barbed post extending from a cage of the one-way roller clutch;

FIG. 7 is a detailed view of the barbed post;

FIG. 8 is a detailed view of a round wire spring used to circumferentially urge a roller of the one-way roller clutch;

FIG. 9 is another detailed view of the round wire spring of FIG. 8;

FIG. 10 is yet another view of the round wire spring illustrating an end formed to conform to a roller, shown in phantom; and FIG. 11 is a perspective view of the bearing block illustrating an alternative construction wherein the block includes an extension portion.

BEST MODE FOR CARRYING OUT THE INVENTION

Figure 1:
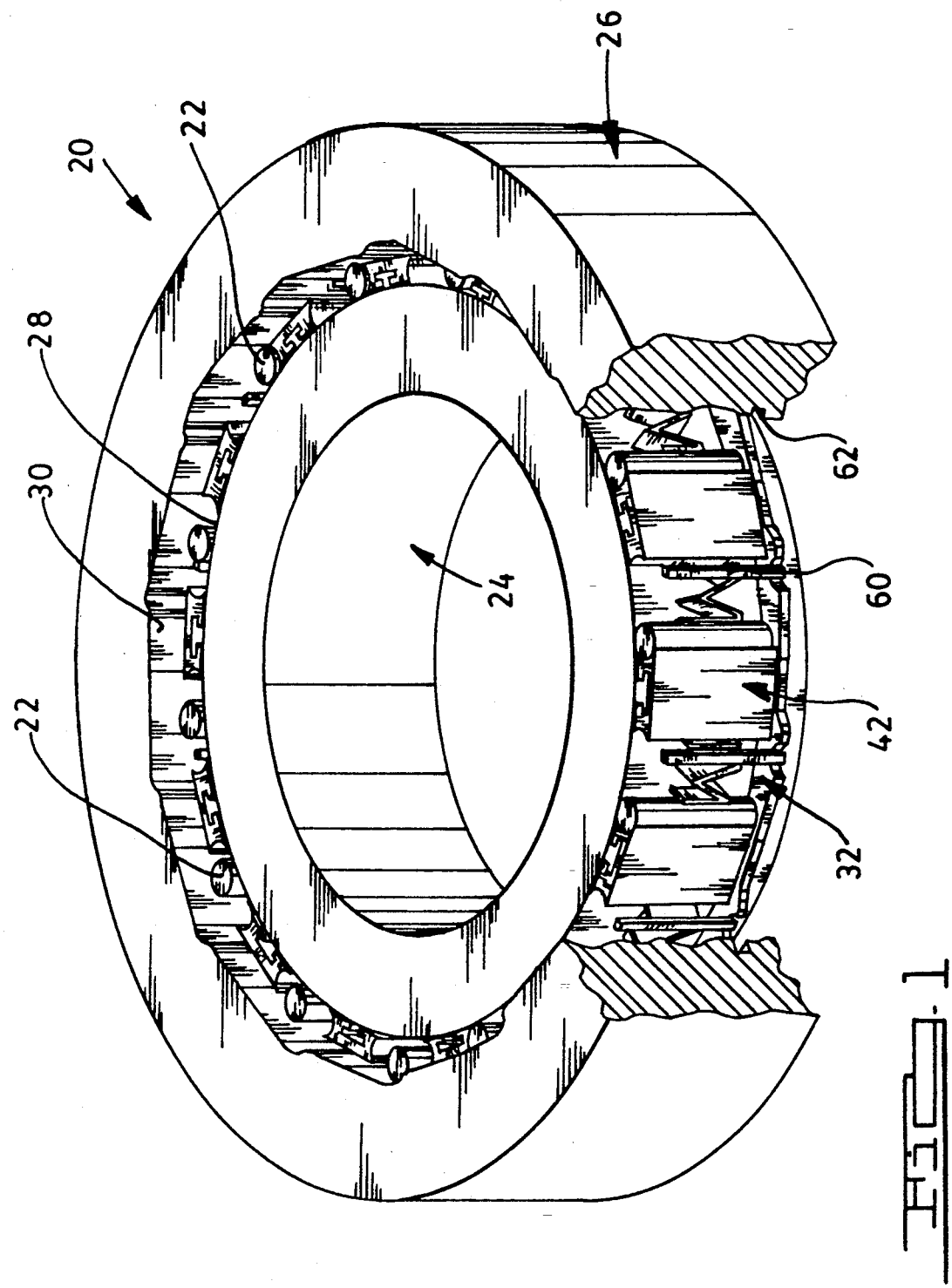
FIG. 1 is a perspective view, partly broken away, of a roller clutch constructed in accordance with the invention.

Referring to FIG. 1 of the drawings, a one-way roller clutch constructed in accordance with the present invention is generally indicated by reference numeral 20. It includes a plurality of cylindrical rollers 22 located between a pair of substantially coaxial inner and outer clutch races 24,26. Rollers 22 are selectively engageable between a cylindrical pathway 28 on inner race 24 and a respective confronting sloped cam ramp 30 formed on the outer clutch race 26. As illustrated in FIG. 3, the rollers 22 move significantly in the circumferential direction between races 24 and 26 during clutch operation.

Referring to FIGS. 1 and 2, clutch 20 includes a cage 32 adapted to be installed between the races 24,26 so as to maintain a substantially fixed orientation relative to the axis of the races. Cage 32 is defined by a ring 34 having inner and outer peripheral edges 36,38. The inner edge 36 is generally circular and the outer edge 38 has a shape generally corresponding to the confronting sloped cam ramp 30 of the outer clutch race 26. A plurality of barbed posts 40 extends from ring 34 between races 24,26 and are generally parallel to the coaxial axis of the races.

A plurality of bearing blocks 42 is mounted over the barbed posts 40. Each bearing block 42 includes a contoured pocket 44 on one side for nesting a respective roller 22. Each of the bearing blocks 42 also includes an attachment portion 46 on the side opposite the pocket 44. Each of a plurality of springs 48, illustrated in FIG. 2 as Z-springs, one for each roller 22, has a first end 50 mounted in the attachment portion 46 of bearing block 42 and a second end 52 in circumferentially urged engagement with a roller 22 nested in an adjacent bearing block which permits stable performance under high speed operating conditions.

With reference to FIGS. 4–7 of the drawings, each bearing block 42 includes a notched channel or slot 54 extending generally parallel to the coaxial direction and located between the contoured pocket 44 and attachment portion 46 for lockingly receiving a barbed post 40. This channel 54 allows the bearing block 42 to be mounted on barbed post 40 so that the bearing block does not come off, yet the bearing block is permitted to move with respect to the post as required during operation. The ability of the bearing block 42 to move on post 40 allows for self-alignment of the bearing block and improved compliance with raceways 24,26.

The attachment portion 46 features a positive locking design for anchoring spring 48. The positive locking design reduces oscillation during operation of the clutch 20.

As illustrated in FIGS. 6 and 11, each bearing block 42 includes a shipping ledge 58 formed in the bearing block and defining the terminus of the contoured pocket 44 to prevent axial dislodging of a roller 22 nested in the pocket. In FIG. 11, shipping ledge 58 is replaced with an extension portion 58' which prevents roller 22 from dislodging, eliminates the need for axial thrust washers and keeps oil within the block 42. The roller 22 is protected from radially dislodging by the shape of contoured pocket 44.

In the preferred embodiment of the invention, cage 32 includes a plurality of formed posts 60, one for each spring 48, extending from ring 34 generally parallel to the coaxial direction and alternately of the barbed posts 40 to protect the springs 48 from pinching during clutch operation and to provide support to rollers 22 under high speed and eccentric conditions. Formed posts 60 are shaped to match roller contour and position. Alternatively, formed posts 60 are angled to match roller contour and position.

Preferably, cage 32 is coated with a friction-reducing compound or is impregnated with a friction-reducing compound to prevent wear at the post 60 and roller 22 interfaces. Such friction reducing compounds include an elastomeric plastic of synthetic rubber energizing material, or a thermoplastic engineering plastic composite material, either filled or unfilled with various reinforcing materials or fibers. Cage 32 can be mounted against axial dislodging between races 24,26 by a conventional snap ring (not shown) fitted into a snap ring groove 62 in the outer race 26.

FIGS. 8–10 illustrate a formed wire configuration spring 48'. Because of its reduced mass, vis a vis Z-spring 48, it has improved load properties that enhance high speed performance although Z-springs 48 provide resistance to centrifugal movement, thus adding stability at higher speed conditions than a standard accordion spring.

FIG. 10 illustrates second end 52 of spring 48' having a cupped shape to protect roller 22 from dislodging in transit and to provide a high speed performance feature. Control and conformance of roller 22 and spring 48' motion is afforded by the contoured shape of the second end 52.

Preferably, rollers 22 are of a low mass to enhance speed capabilities of the one-way clutch 20. Roller 22 can be a hollow roller or a ceramic roller to reduce mass. Special roller end treatments such as cupping may also be used to enhance high speed engagement performance.

While the best mode for carrying out the invention has been described in detail, those familiar with the art to which this invention relates will recognize various alternative designs and embodiments for practicing the invention as defined by the following claims.

I claim:

1. A roller clutch (20) in which a plurality of cylindrical rollers (22) is located between first and second substantially coaxial clutch races (24,26), coaxial about a single axis extending in an axial direction, and in which each of said rollers (22) is selectively engageable between a cylindrical pathway (28) on the first race (24) and a respective confronting sloped cam ramp (30) formed on the second race (26), and in which said rollers (22) must move in a circumferential direction between said races (24,26) during clutch operation, said roller clutch comprising:

- a cage (32) installable between said races (24,26) so as to maintain a substantially fixed orientation relative to the axis of said races; said cage (32) being defined by a ring (34) having inner and outer peripheral edges (26,38); said inner edge (36) being generally circular and said outer edge (38) having a shape generally corresponding to the shape of the confronting sloped cam ramp (30) formed outer race surface of said second race (26); said cage (32) including a plurality of barbed posts (40) extending from said ring (34) and being generally parallel to the axis of said races (24,26);
- a plurality of bearing blocks (42) mounted over said barbed posts (40); each one of said plurality of bearing blocks (42) including a contoured pocket (44) on one side for nesting a respective roller (22) thereon; each one of said plurality of bearing blocks (42) including an attachment portion (46) on a side opposite of said pocket (44); and
- a plurality of springs (48), one for each said roller (22), each spring (48) having one end (50) mounted in said attachment portion (46) of one bearing block (42) and a second end (52) in engagement with a roller (22) nested in an adjacent bearing block (42) whereby to permit stable performance under high speed operating conditions.

2. A roller clutch (20) as in claim 1 wherein each one of said plurality of bearing blocks (42) includes a notched channel (54), extending generally parallel to the axes of said races (24,26) between said contoured pocket (44) and said attachment portion (46) for receiving said barbed posts (40).

3. A roller clutch (20) as in claim 2 wherein each one of said plurality of bearing blocks (42) includes a shipping ledge (56) formed in said bearing block (42) and defining a side terminus of the contoured pocket (44) to prevent axial dislodging of a roller (22) nested therein.

4. A roller clutch (20) as in claim 2 wherein said attachment portion (46) is a channel extending in the axial direction along said bearing block (42).

5. A roller clutch (20) as in claim 4 wherein said cage (32) further includes a plurality of formed posts (60), one for each spring (48), extending from said ring (34) generally parallel to the axes of said races (24,26) thereby protecting said springs (48) from pinching and providing support to said rollers (22) under high speed and eccentric loading conditions.

6. A roller clutch (20) as in claim 5 wherein said formed posts (60) are shaped to match said roller (22) contour and position.

7. A roller clutch (20) as in claim 5 wherein said formed posts (60) are angled to match said roller (22) contour and position.

8. A roller clutch (20) as in claim 5 wherein said cage (32) is impregnated with a friction-reducing compound.

9. A roller clutch (20) as in claim 8 wherein said friction-reducing compound is an elastomeric plastic of synthetic rubber energizing material.

10. A roller clutch (20) as in claim 9 wherein said elastomeric plastic is filled with various reinforcing materials.

11. A roller clutch (20) as in claim 8 wherein said friction-reducing compound is a thermoplastic engineering plastic composite material.

12. A roller clutch (20) as in claim 11 wherein said engineering plastic composite material is filled with various reinforcing materials.

13. A roller clutch (20) as in claim 1 wherein said springs (48) are of a flat Z-spring configuration.

14. A roller clutch (20) as in claim 1 wherein said springs (48) are of a formed wire configuration.

15. A roller clutch (20) as in claim 1 wherein said rollers (22) are hollow.

16. A roller clutch (20) as in claim 15 wherein said rollers (22) are cupped.

17. A roller clutch (20) as in claim 1 wherein said rollers (22) are ceramic.

18. An improved roller clutch (20) in which a plurality of cylindrical rollers (22) is located between first and second substantially coaxial clutch races (24,26), coaxial about a single axis, and in which each of said rollers (22) is selectively engageable between a cylindrical pathway (28) on a first race (24) and a respective confronting sloped cam ramp (30) formed on the second race (26), and in which said rollers (22) must move in circumferential direction between said races (24,26) during clutch operation and including a cage (32) installable between said races (24,26) so as to maintain a substantially fixed orientation relative to the axis of said races (24,26), and a plurality of springs (48), one for each of said rollers (22), wherein the improvement is that each spring (48) has one end (50) mounted in said attachment portion (46) of one bearing block (42) and a second end (52) in engagement with a roller (22) nested in an adjacent bearing block (42) thereby permitting stable performance under high speed operating conditions; said cage (32) being defined by a ring (34) having inner and outer peripheral edges (36,38); said inner edge (36) being generally circular and said outer edge (38) having a shape generally corresponding to the shape of the confronting sloped cam ramp (30) formed in the second race (26); said cage (32) including a plurality of barbed posts (40) extending from said ring (34) and being generally parallel to the axes of said races (24,26); and a plurality of bearing blocks (42) mounted over said barbed posts (40); each of said bearing blocks (42) including a contoured pocket (44) on one side for nesting a respective roller (22) thereon; each of said bearing blocks (42) including an attachment portion (46) on a side thereof opposite said pocket (44) thereby providing stability under high speed operating conditions.

* * * * *

UNITED STATES PATENT AND TRADEMARK OFFICE
CERTIFICATE OF CORRECTION

PATENT NO. : 5,176,232

DATED : January 5, 1993

INVENTOR(S) : Gregory J. Malecha

It is certified that error appears in the above-identified patent and that said Letters Patent is hereby corrected as shown below:

Col. 2, line 65, after "the" insert -- present --.

Claim 1, col. 5, line 14, delete "(26,38)" and insert -- (36,38) --.

Signed and Sealed this

First Day of February, 1994

Attest:

BRUCE LEHMAN

Attesting Officer     Commissioner of Patents and Trademarks